United States Patent [19]

Sletten et al.

[11] 3,735,399

[45] May 22, 1973

[54] METHOD FOR IMPROVING THE TARGET POSITION VECTOR ACCURACY OF AN AMTI RADAR

[75] Inventors: Carlyle J. Sletten, Acton; F. Sheppard Holt, Winchester, both of Mass.

[73] Assignee: The United States of America as represented by the Secretary of the Air Force, Washington, D.C.

[22] Filed: Nov. 23, 1971

[21] Appl. No.: 201,581

[52] U.S. Cl. ................................. 343/7.7, 343/5 CM

[51] Int. Cl. ............................................. G01s 9/42

[58] Field of Search ............... 343/5 CM, 7.7, 17.1 R

[56] References Cited

UNITED STATES PATENTS 3,161,873   12/1964   Hollingsworth ...................... 343/7.7

Primary Examiner—T. H. Tubbesing
Attorney—Harry A. Herbert, Jr. and Willard R. Matthews, Jr.

[57] ABSTRACT

Target bearing angle accuracy is improved through increased time on target followed by processing including averaging and synthetic aperture techniques. The course target position vector provided by an AMTI interferometer type radar is analytically extended to its point of minimum range. The target range, bearing, and velocity values for the point are adjusted to incorporate a minimized error function derived from measured and calculated target position data for a given interval of time. The adjusted values are used to establish a more accurate target position vector.

1 Claim, 2 Drawing Figures

METHOD FOR IMPROVING THE TARGET POSITION VECTOR ACCURACY OF AN AMTI RADAR

BACKGROUND OF THE INVENTION

This invention relates to airborne moving target indicating radar systems, and in particular to means for improving the accuracy of target bearing information derived therefrom.

An AMTI radar system typical of the type to which the present invention applies is disclosed in our copending U. S. patent application Ser. No. 201,582 entitled, AMTI Radar Clutter Cancelling Method and Apparatus, filed on even date herewith. Such a system employs synthetic aperture techniques and utilizes multiple antennas disposed along the flight velocity vector of the observer aircraft. The target bearing data provided by such a system is basically the output of an interferometer whose accuracy is in the order of 1° to 5°. With such a system bearing accuracy is maximum at minimum target range and diminishes as distance between aircraft and headings change. For many applications such course bearing information is grossly inadequate. There currently exists therefore the need for improving the accuracy of AMTI radar bearing information whereby target position vectors can be reliably determined and projected. The present invention is directed toward satisfying such a need.

SUMMARY OF THE INVENTION

The observer aircraft flight velocity vector and the target flight velocity vector as described in the interferometer of the AMTI radar are initially extended to a minimum range condition (maximum bearing accuracy condition). Over an interval of time a series of position measurements are taken at times $t_1, t_2 \ldots t_n$. The target position for the time $t_n$ is calculated on the basis of the range, bearing and velocity values as extended to the minimum range condition. An error function is derived from the difference between the calculated target position at $t_n$ and the actual measured target position at $t_n$. The error function is minimized with respect to the minimum range condition parameters and such minimum range condition parameters are subsequently adjusted to incorporate the minimized error function. Target bearing is then calculated using the adjusted minimum range condition parameters.

It is the principal object of the invention to provide a new and improved method for improving the target position vector of an AMTI radar.

Such object, together with other features and advantages of the invention, will become more readily apparent from the following detailed description when taken in conjunction with the illustrated embodiments in the accompanying drawings.

DETAILED DESCRIPTION OF THE PREFERRED METHOD

Figure 1:
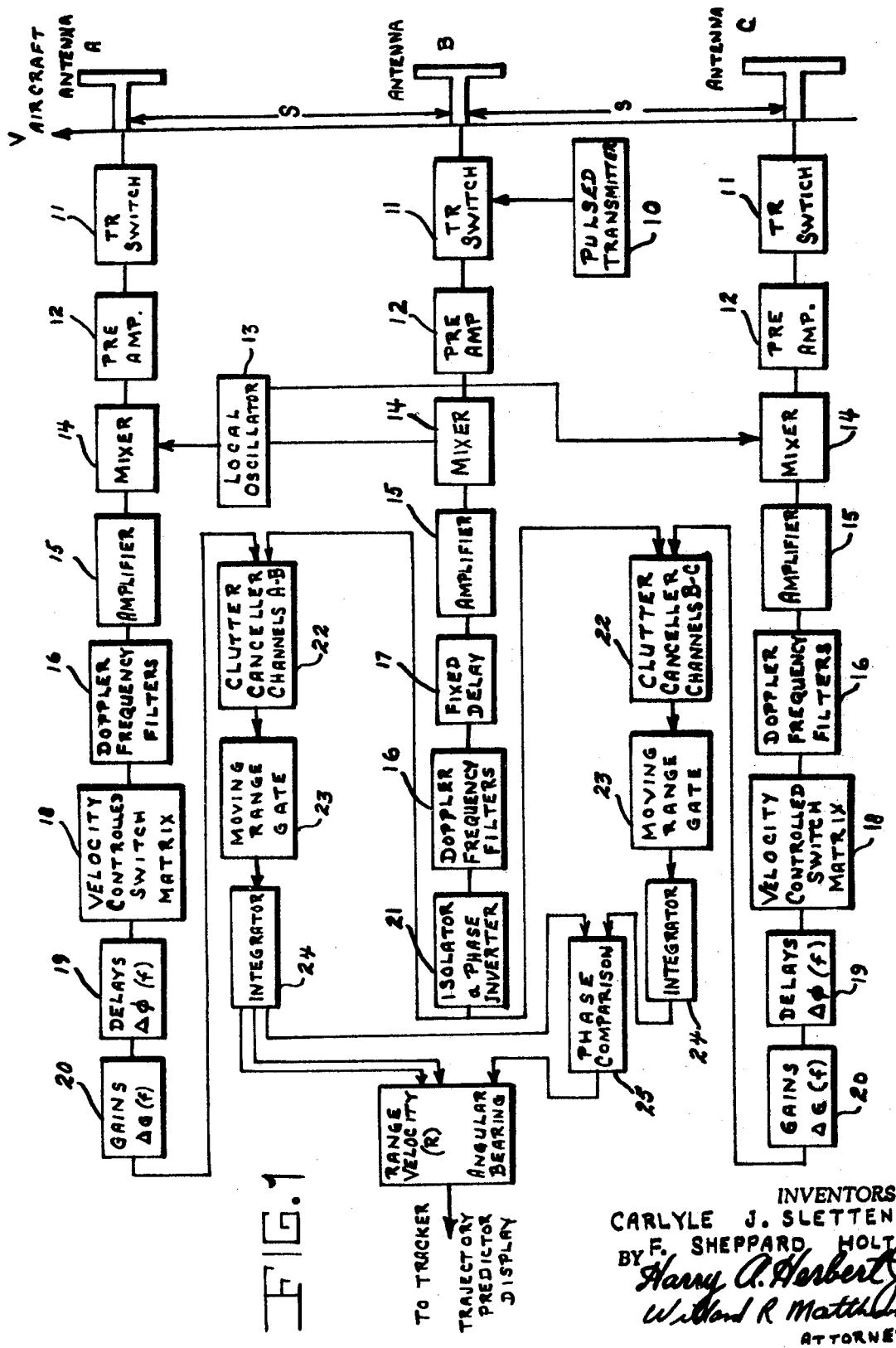
FIG. 1 is a block diagram of am AMTI radar system of the type comprehended by the invention.

Referring now to FIG. 1, there is illustrated thereby in block diagram an AMTI radar system of the type to which the method of the present invention can advantageously be applied. Antennas A, B and C are positioned on the observer aircraft in a line coincident with its velocity vector V a distance S apart. TR switches 11 permit transmitting and receiving on all antennas although in practice transmitter 10 would normally only transmit through antenna B. The received doppler echo signals are amplified by preamplifiers 12 and mixed with the output of local oscillator 13 in mixer 14. After further amplification by amplifiers 15 the signals are filtered into narrow band channels by doppler filters 16. Antenna B is provided with a fixed delay 17 to permit phase coincidence of the signals on all antennas (both leading and lagging). Doppler frequency signals in the clutter frequency spectrum are delayed on antennas A and C by means of delay lines 19. Velocity controlled switch matrixes 18 connect the narrow band channels to appropriate delays in response to aircraft ground speed. The doppler echo signals in the clutter frequency spectrum from all antennas are thus made phase coincident. The signals from antenna B are phase inverted by phase inverter 21. This phase inverted signal is then summed with the outputs of antennas A and C in clutter cancellers 22. Signals from moving targets are not cancelled and are fed to moving range gate 23. The outputs of range gates 23 are integrated by integrators 24 to improve system gain. The outputs of integrators 24 are compared by phase comparator 25 to ascertain target bearing information. The method of the present invention improves the accuracy of such bearing information in the manner hereinafter described.

The observations on distant or weak echoes require a second or so for detection (integration in moving range bins) and then the signals gathered simultaneously by interferometer AB–BC are phase compared and presented to on-board computer logic for location of targets, their presentations, and prediction of future target trajectory. The observed data are essentially corrected for the aircraft radar platform motion, and analytic rendering of the information as time progresses permits reviewing of the target over a long base line. This horizontal base line allows improved angle determination.

The observational data includes relative time, range, range difference, doppler frequency shift (leading to radial range rate), observer (radar platform) velocity, and bearing angle. Relative time, range doppler frequency shift, and observer velocity can be accurately determined while bearing angle can only be coarsely determined to within 1° – 5°. Range differences can be determined to very high accuracy ($\sim \lambda/50$). Bearing angle accuracy can be improved in accordance with the method of the invention through increased time on target followed by processing including averaging and synthetic aperture techniques. The remarkably good bearing accuracy obtained in the fixed target case with state of the art fixed target detection systems depends on accurate determination of range differences by an observer whose motion over an extended path is accurately known relative to the target. In the moving target case with the system presented here the motion of the observer relative to the target is known only through the coarse (AB–BC interferometer) bearing data. However, the accuracy of the determination of this path can be improved by averaging or by least mean square techniques. For the fixed target system the highest angular accuracy for a given length of observation interval occurs when the observer path is nearly normal to the radial vector from the fixed target to the observer. For the moving target case the highest accuracy for a given length of observation interval occurs when the path of the observer relative to the target is nearly normal to the radial vector from the target to the observer. For both types of targets these optimum conditions are associated with low doppler shift but high rate of doppler shift. They are also associated with minimum target range and maximum rate of change of true bearing angle. Thus judicious choice of the observer ground path can lead to an optimum or nearly optimum observer path relative to the target.

A least mean square method for improving angular accuracy in the moving target case proceeds as follows:

Assume that an observer O (the radar aircraft) and a target are both moving with uniform velocity in a horizontal plane. If $\vec{v}_a$ is the observer radar velocity relative to the ground and $\vec{v}_b$ is the target velocity relative to the ground, then $\vec{v}_o$, the velocity of the target relative to the observer, is also uniform. If $\vec{v}_a$ is accurately known then calculation of $\vec{v}_o$ will yield $\vec{v}_b$ since $$\vec{v}_b = \vec{v}_a + \vec{v}_o$$

Figure 2:
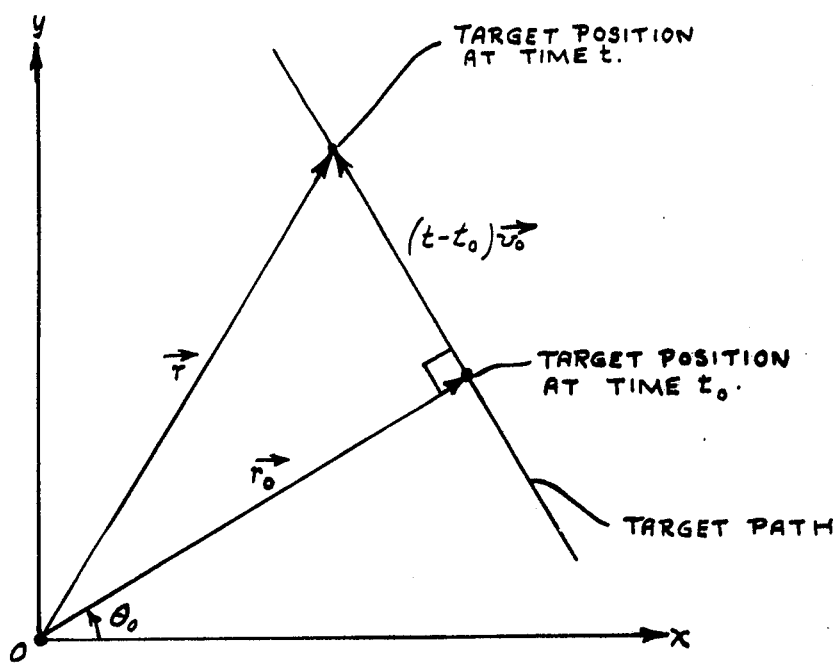
FIG. 2 illustrates relative observer aircraft and target flight velocity vectors and other relevant parameters necessary to resolving target position vector problems by the method of the invention.

Let xy be a rectangular coordinate system moving in the horizontal plane with origin fixed at the observer as illustrated in FIG. 2. Then the target position vector relative to O will be $\vec{r} = \vec{r}_o + \vec{v}_o (t-t_o)$ where $t$ is time, $\vec{r}_o$ is the target position vector to the point on the target path closest to O and $t_o$ is the time at which $\vec{r} = \vec{r}_o$.

Let
$r_o$ = magnitude of $\vec{r}_o$
$\theta_o$ = angle of $\vec{r}_o$ measured positive counter clockwise relative to the x axis,
and $v_o$ = magnitude of $\vec{v}_o$ with sign affixed positive if target motion about O is counterclockwise and negative if target motion is clockwise. The vectors $\vec{r}_o$ and $\vec{v}_o$ can then be written $$\vec{r}_o = r_o \cos \theta_o \hat{i} + r_o \sin \theta_o \hat{j}$$
$$\vec{v}_o = -v_o \sin \theta_o \hat{i} + v_o \cos \theta_o \hat{j}$$

where $\hat{i}$ and $\hat{j}$ are the conventional unit vectors in the x and y directions respectively.

The target position vector is then a function of the four parameters $r_o$, $\theta_o$, $v_o$, and $t_o$ as follows:

$$\vec{r}(t) = \vec{r}_o + (t - t_o) \vec{v}_o$$
$$= [r_o \cos \theta_o - (t - t_o) v_o \sin \theta_o] \hat{i}$$
$$+ [r_o \sin \theta_o + (t - t_o) v_o \cos \theta_o] \hat{j}$$

Let the position of a target be observed to within a known accuracy at a series of times $t = t_1, t_2 \ldots t_N$. Assuming the target to have uniform velocity, we wish to determine $r_o, \theta_o, v_o, t_o$ such that the target motion associated with the choice of the parameters fits the observed data most closely in a least mean square sense. Let the error function E be defined as $$E = \sum_{n=1}^{N} (\vec{p}_n - \vec{r}_n)^2$$

where $\vec{p}_n = \hat{x}_n \hat{i} + y_n \hat{j}$ is the observed target position at $t = t_n$ and $r_n$ is the target position calculated at $t = t_n$ on the basis of general target parameters, $r_o, \theta_o, V_o$ and $t_o$. The procedure is to minimize E relative to these parameters.

Necessary conditions for minimizing E are $$\delta E/\delta r_o = \delta E/\delta \theta_0 = \delta E/\delta v_o = \delta E/\delta t_o = 0$$

These conditions lead to the equations:

$$\sum_{n=1}^{N} [x_n \cos \theta_0 + y_n \sin \theta_0 - r_0] = 0$$

$$\sum_{n=1}^{N} \{[x_n r_0 + y_n(t_n - t_0)v_0] \sin \theta_0 + [-y_n r_0 + x_n(t_n - t_0)v_0 \cos \theta_0]\} = 0$$

$$\sum_{n=1}^{N} \{(t_n - t_0)[x_n \sin \theta_0 - y_n \cos \theta_0 + (t_n - t_0)v_0]\} = 0$$

$$\sum_{n=1}^{N} [x_n \sin \theta_0 - y_n \cos \theta_0 + (t_n - t_0)v_0] = 0.$$

or $$X \cos \theta_o + Y \sin \theta_o = N r_o \quad (1)$$

$$[X r_o + (Y_t - Y t_o)v_o] \sin \theta_o + [-Y r_o + (X_t - X t_o)v_o] \cos \theta_o = 0 \quad (2)$$

$$(X_t - X t_o)\sin \theta_o + (-Y_t + Y t_o) \cos \theta_o = (2 T t_o - T_t - N t^2_o)v_o \quad (3)$$

$$X \sin \theta_o - Y \cos \theta_o = -(T - N t_o)v_o \quad (4)$$

where $$X = \sum_{n=1}^{N} x_n, \quad X_t = \sum_{n=1}^{N} t_n x_n$$

$$Y = \sum_{n=1}^{N} y_n, \quad Y_t = \sum_{n=1}^{N} t_n y_n$$

$$T = \sum_{n=1}^{N} t_n, \quad T_t = \sum_{n=1}^{N} t^2_n$$

Solving (1) and (4) for $\sin \theta_o$ and $\cos \theta_o$ we have $$\sin \theta_o = [Y N r_o = X (T - N t_o) v_o]/X^2 + Y^2 \quad (5)$$

and $$\cos \theta_o = [Y N r_o + Y (T - N t_o) v_o]/X_2 + Y^2 \quad (6)$$

Also $$\sin^2 \theta_o + \cos^2 \theta_o = 1$$

implies $$(N r_o)^2 + (T - N t_o)^2 v_o^2 = \overline{X}^2 + \overline{X}^2 \quad (7)$$

Substituting (5) and (6) into (3) yields $$(\overline{X}\overline{Y}_t - \overline{Y}\overline{X}_t)N r_o + (\overline{X}\overline{X}_t + \overline{Y}\overline{Y}_t)(T - N t_0)v_0 = (T_t - T t_0)v_0(\overline{X}^2 + \overline{X}^2) \quad (8)$$

Substituting (1) into (2) yields $$(\overline{X}r_0 + \overline{Y}_t v_0) \sin \theta_0 + (-\overline{Y}r_0 + \overline{X}_t v_0) \cos \theta_0 = Nr_0 t_0 v_0 \quad (9)$$

and substituting (5) and (6) into (9) yields $$(\overline{X}\,\overline{X}_t + \overline{Y}\,\overline{Y}_t) Nr_0 - (\overline{X}\,\overline{Y}_t - \overline{Y}\,\overline{X}_t)(T - Nt_0) v_0$$
$$= (\overline{X}^2 + \overline{Y}^2) Tr_0 \quad (10)$$

Equations (7), (8) and (10) can be solved for $r_o$, $t_o$, and $v_o$ as follows:

$$r_o = \sqrt{A\,B^2/(BN)^2 + (CN - AT)^2} \quad (11)$$

$$t_o = T/N - 1/N\,[A(NT_t - T^2)(CN - AT)/(BN)^2 + (CN - AT)^2] \quad (12)$$

$$v_o = r_o\,(CN - AT)/B(T - Nt_o) \quad (13)$$

where $$A = \overline{X}^2 + \overline{Y}^2$$

$$B = \overline{X}\,\overline{Y}_t - \overline{Y}\,\overline{X}_t$$

$$C = \overline{X}\,\overline{X}_t + \overline{Y}\,\overline{Y}_t$$

Equations (5) and (6) then determine the remaining parameter $\theta_o$.

Thus the target path parameters for best least square fit can be determined explicitly in terms of quantities calculatable from the observed target position data.

The procedure that has been described here can use all measured range information available in any observation interval. Measured doppler information yielding radial range rate is not used directly but is implicit in the range information. The solution presented is an optimum relative to the criteria adopted; that is, the solution minimizes the error $E$ where $$E = \sum_{n=1}^{N} (\vec{p}_n - \vec{r}_n)^2$$

While the invention has been described in terms of one presently preferred method, it is understood that the words which have been used are words of description rather than words of limitation and that changes with the purview of the appended claims may be made without departing from the scope and spirit of the invention in its broader aspects. What is claimed is:

1. In conjunction with an observer aircraft equipped with an AMTI radar system capable of providing target range and course interferometer bearing data, the method of deriving a target position vector of improved accuracy comprising the steps of assigning values for the parameters of minimum range, bearing at minimum range, target velocity, and time at which the target is at minimum range for the true target path, analytically extending a course target velocity vector obtained from the radar system output to a minimum range condition, taking a series of target position measurements at times $t_1, t_2, \ldots t_n$, calculating on the basis of the extended range, bearing and velocity values at minimum range condition the target position at time $t_n$, deriving an error function from the difference between the final measured target position values and the calculated target position values, minimizing said error functions for range bearing and velocity values at the minimum range condition, adjusting the extended range, bearing and velocity values for minimum range conditions to incorporate said minimized error functions, and calculating a target position vector from said adjusting values.

* * * * *